US010675839B2

(12) United States Patent
Ohara

(10) Patent No.: US 10,675,839 B2
(45) Date of Patent: Jun. 9, 2020

(54) FIBER REINFORCED RESIN PRODUCT

(71) Applicant: HONDA MOTOR CO., LTD., Minato-ku, Tokyo (JP)

(72) Inventor: Takeshi Ohara, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/927,130

(22) Filed: Mar. 21, 2018

(65) Prior Publication Data
US 2018/0272656 A1 Sep. 27, 2018

(30) Foreign Application Priority Data

Mar. 27, 2017 (JP) ................. 2017-061268

(51) Int. Cl.
B32B 7/02 (2019.01)
B32B 5/24 (2006.01)
(Continued)

(52) U.S. Cl.
CPC ............... B32B 7/02 (2013.01); B32B 3/08 (2013.01); B32B 5/22 (2013.01); B32B 5/24 (2013.01);
(Continued)

(58) Field of Classification Search
None
See application file for complete search history.

(56) References Cited

U.S. PATENT DOCUMENTS 7,364,407 B2 * 4/2008 Grabau ............... F03D 1/065
416/229 R
2005/0136761 A1 * 6/2005 Murakami ............ B32B 5/26
442/59
2008/0100046 A1 * 5/2008 Hayakawa .......... B60R 21/0136
280/735
2019/0047480 A1 * 2/2019 Espig ................. B60R 9/055

FOREIGN PATENT DOCUMENTS

EP 1485610 12/2004
JP 08-099364 4/1996
JP 2011-031481 2/2011

OTHER PUBLICATIONS

Rockwest Composites, "Carbon Fiber vs. Fiberglass Tubing. Which is better?", (https://www.rockwestcomposites.com/blog/carbon-fiber-vs-fiberglass-tubing-which-is-better/). (Year: 2017).*
(Continued)

Primary Examiner — Elizabeth A Robinson
Assistant Examiner — Nicole T Gugliotta
(74) Attorney, Agent, or Firm — Amin, Turocy & Watson, LLP

(57) ABSTRACT

A fiber reinforced resin product includes at least one layer of a first fiber reinforced resin layer in which first reinforcing fibers having a large breaking elongation are contained in a layered form, and at least one layer of a second fiber reinforced resin layer in which second reinforcing fibers having a smaller breaking elongation and a larger tensile strength in comparison with those of the first fiber reinforced resin layer are contained in a layered form. The second fiber reinforced resin layer is positioned outwardly of the first fiber reinforced resin layer. Furthermore, the first fiber reinforced resin layer and the second fiber reinforced resin layer share a single matrix resin in common.

6 Claims, 6 Drawing Sheets

(51) Int. Cl.
  *B32B 5/22* (2006.01)
  *B32B 3/08* (2006.01)
  *B32B 5/26* (2006.01)
  *B32B 27/06* (2006.01)
(52) U.S. Cl.
  CPC ............ *B32B 5/26* (2013.01); *B32B 2250/02* (2013.01); *B32B 2250/03* (2013.01); *B32B 2250/04* (2013.01); *B32B 2250/05* (2013.01); *B32B 2250/20* (2013.01); *B32B 2250/24* (2013.01); *B32B 2250/40* (2013.01); *B32B 2250/42* (2013.01); *B32B 2260/021* (2013.01); *B32B 2260/023* (2013.01); *B32B 2260/046* (2013.01); *B32B 2262/0261* (2013.01); *B32B 2307/412* (2013.01); *B32B 2307/536* (2013.01); *B32B 2307/54* (2013.01); *B32B 2307/546* (2013.01); *B32B 2603/00* (2013.01); *B32B 2605/00* (2013.01); *B32B 2605/08* (2013.01)

(56) References Cited

OTHER PUBLICATIONS

MatWeb "Polyimide": http://www.matweb.com/search/DataSheet.aspx?MatGUID=ab35b368ab9c40848f545c35bdf1a672&ckck=1 (Year: 1996).*
Andrew Roberts (ANROB(R)): https://www.andrewroberts.com/ptfe-fabric/ (Year: 2017).*
Easy Composites CLEARPOL Extra Clear ISO NPG Polyester Gelcoat: https://www.easycomposites.co.uk/#!/resin-gel-silicone-adhesive/polyester-and-vinylester/superior-clear-polyester-gelcoat.html (Year: 2015).*
Matweb, "Overview of materials for Epoxy Cure resin," http://www.matweb.com/search/datasheet_print.aspx?matguid=956da5edc80f4c62a72c15ca2b923494 (Year: 2019).*
Extended European Search Report for European Patent Application No. 18163904.8 dated Aug. 31, 2018.

* cited by examiner

FIBER REINFORCED RESIN PRODUCT

CROSS-REFERENCE TO RELATED APPLICATION

This application is based upon and claims the benefit of priority from Japanese Patent Application No. 2017-061268 filed on Mar. 27, 2017, the contents of which are incorporated herein by reference.

BACKGROUND OF THE INVENTION

Field of the Invention

The present invention relates to a fiber reinforced resin product, and more particularly, relates to a fiber reinforced resin product in which a single matrix resin is impregnated into a plurality of reinforcing fiber layers.

Description of the Related Art

A fiber reinforced resin in which a matrix resin is incorporated into reinforcing fibers is used as various structural materials due to its being lightweight yet superior in terms of strength and rigidity. As suitable examples for this type of structural material (i.e., a fiber reinforced resin product) there may be cited, for example, a cowl, a fender, or the like of a motorcycle. Further, in Japanese Laid-Open Patent Publication No. 08-099364, a propeller shaft as a fiber reinforced resin product is disclosed.

The propeller shaft disclosed in Japanese Laid-Open Patent Publication No. 08-099364 is constituted by disposing a resin layer with respect to a laminated body obtained by laminating a plurality of FRP layers made from a fiber reinforced resin, wherein the resin layer is made from a resin having a lower toughness in comparison with that of the matrix resin of the fiber reinforced resin. In this configuration, when a large impact load is applied to the propeller shaft, cracks are generated in the resin layer prior to being generated in the laminated body, and as a result, the resin layer changes in color. By visually confirming such a change in color, the user can recognize that a large impact load has acted on the propeller shaft before the occurrence of cracks in the laminated body.

SUMMARY OF THE INVENTION

In the case that a resin layer is provided in the manner described in Japanese Laid-Open Patent Publication No. 08-099364, in order to enhance adhesion between the resin layer and the laminated body, it may be considered to mutually attach by melting the resin that forms the resin layer, and the matrix resin of the laminated body (the respective FRP layers). However, in this case, since the resin and the matrix resin are mixed together, the difference in toughness of both resins becomes small.

Further, in order to make the resin and the matrix resin different in toughness, for example, the same thermosetting resin is used, and the resin that becomes the resin layer is coated at a stage at which the matrix resin has not yet cured, and thereafter, it is necessary for the resin to be cured in advance of the matrix resin, by carrying out thermal curing of the resin under preferential curing conditions. Setting of such conditions is complicated, and further, the degree of freedom of the manufacturing conditions of the fiber reinforced resin product is limited.

A principal object of the present invention is to provide a fiber reinforced resin product by which it can easily be grasped that a specified load has acted on the fiber reinforced resin product.

Another object of the present invention is to provide a fiber reinforced resin product which can be obtained by a simple method.

In accordance with an embodiment of the present invention, a fiber reinforced resin product is provided, comprising at least one layer of a first fiber reinforced resin layer in which first reinforcing fibers are contained in a layered form, and at least one layer of a second fiber reinforced resin layer in which second reinforcing fibers having a smaller breaking elongation in comparison with that of the first reinforcing fibers are contained in a layered form;

wherein the second fiber reinforced resin layer is positioned outwardly of the first fiber reinforced resin layer; and the first fiber reinforced resin layer and the second fiber reinforced resin layer share a single matrix resin in common.

More specifically, the fiber reinforced resin product according to the present invention is configured to include the first reinforcing fibers and the second reinforcing fibers, the breaking elongations of which are different from each other. In addition, the outwardly positioned second reinforcing fibers have a smaller breaking elongation in comparison with that of the first reinforcing fibers. Therefore, even if the second reinforcing fibers become broken, there is still room for the first reinforcing fibers to stretch. Stated otherwise, the fiber reinforced resin product does not undergo breakage. Accordingly, by grasping visually that the second reinforcing fibers have become broken, the user can easily recognize that a specified load has acted on the fiber reinforced resin product.

In addition, the first reinforcing fibers and the second reinforcing fibers share a single matrix resin in common. Therefore, the toughness of the matrix resin being lowered due to mixing of different types of matrix resins is avoided. Also, no restriction is placed on the type of matrix resin that is used.

Furthermore, there is no necessity that the curing rate of the matrix resin be different between the interior and the surface layer portions thereof. Therefore, the degree of freedom of the manufacturing conditions of the fiber reinforced resin product increases. Stated otherwise, the fiber reinforced resin product can be manufactured by a simple method.

When the first fiber reinforced resin layer is laminated in a plurality of layers, it is possible to use as the first reinforcing fibers a material having a smaller tensile strength than that of the second reinforcing fibers. In this case, the choice of materials used for the first reinforcing fibers, which have a larger breaking elongation than that of the second reinforcing fibers, increases. Stated otherwise, the degree of freedom in selecting the materials is enhanced. In addition, since the first fiber reinforced resin layer is laminated in a plurality of layers, the overall tensile strength of the first fiber reinforced resin layers is increased. Therefore, after the second reinforcing fibers have broken, the first reinforcing fibers can be stretched without immediately breaking.

Moreover, in this case, the second fiber reinforced resin layer may be positioned outwardly of the laminated plural layers of the first fiber reinforced resin layer.

The matrix resin preferably is made from a material whose breaking elongation is larger in comparison with that of the second reinforcing fibers. In accordance with this feature, breakage of the matrix resin taking place before breakage of the second reinforcing fibers can be avoided.

Further, a transparent resin layer, which is made from a resin having a larger breaking elongation in comparison with that of the matrix resin, the first reinforcing fibers, and the second reinforcing fibers, preferably is disposed outwardly of the second fiber reinforced resin layer. In this case, even after the second reinforcing fibers have broken, the state of being covered by the transparent resin layer is maintained. Accordingly, exposure of the fibers is avoided.

Furthermore, a flexible fiber resin layer preferably is provided in which flexible fibers are included in a layered form, the flexible fibers having a greater flexibility and a lower bonding force with respect to the matrix resin in comparison with those of the first reinforcing fibers and the second reinforcing fibers. The flexible fiber resin layer may be disposed in an intervening manner between the first fiber reinforced resin layer and the second fiber reinforced resin layer, or between respective ones of the first fiber reinforced resin layers.

The flexible fibers have a smaller bonding force with respect to the matrix resin than that of the first reinforcing fibers and the second reinforcing fibers. In addition, the flexible fibers have a greater flexibility than that of the first reinforcing fibers and the second reinforcing fibers. Accordingly, when a bending load acts on the fiber reinforced resin product, the flexible fiber resin layer bends and becomes exposed from the matrix resin. Therefore, even if an excessive load acts on the fiber reinforced resin product, it is unlikely for the fiber reinforced resin product to become divided into parts.

The fiber reinforced resin product preferably includes a load detecting monitor member made from a resin having a smaller flexibility in comparison with that of the matrix resin and the first reinforcing fibers.

Since the load detecting monitor member is low in flexibility, the monitor member becomes deformed or damaged prior to breakage of the first reinforcing fibers. By recognizing such a condition, the user is capable of grasping that a specified load has acted on the fiber reinforced resin product.

According to the present invention, the first reinforcing fibers and the second reinforcing fibers are included having breaking elongations which differ from each other, and together therewith, the second reinforcing fibers, which have a breaking elongation smaller in comparison with that of the first reinforcing fibers, are disposed outwardly, thereby constituting the fiber reinforced resin product. In accordance with this structure, the second reinforcing fibers are broken in advance, and the first reinforcing fibers are still capable of being stretched. At this stage, by grasping visually that the second reinforcing fibers have become broken, the user is capable of recognizing that a specified load has acted on the fiber reinforced resin product.

In addition, the first reinforcing fibers and the second reinforcing fibers share a single matrix resin in common. Furthermore, there is no necessity that the curing rate of the matrix resin be different between the interior and the surface layer portions thereof. For the above reasons, the degree of freedom of the manufacturing conditions of the fiber reinforced resin product increases, and therefore, the fiber reinforced resin product can be manufactured by a simple method.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Figure 1:
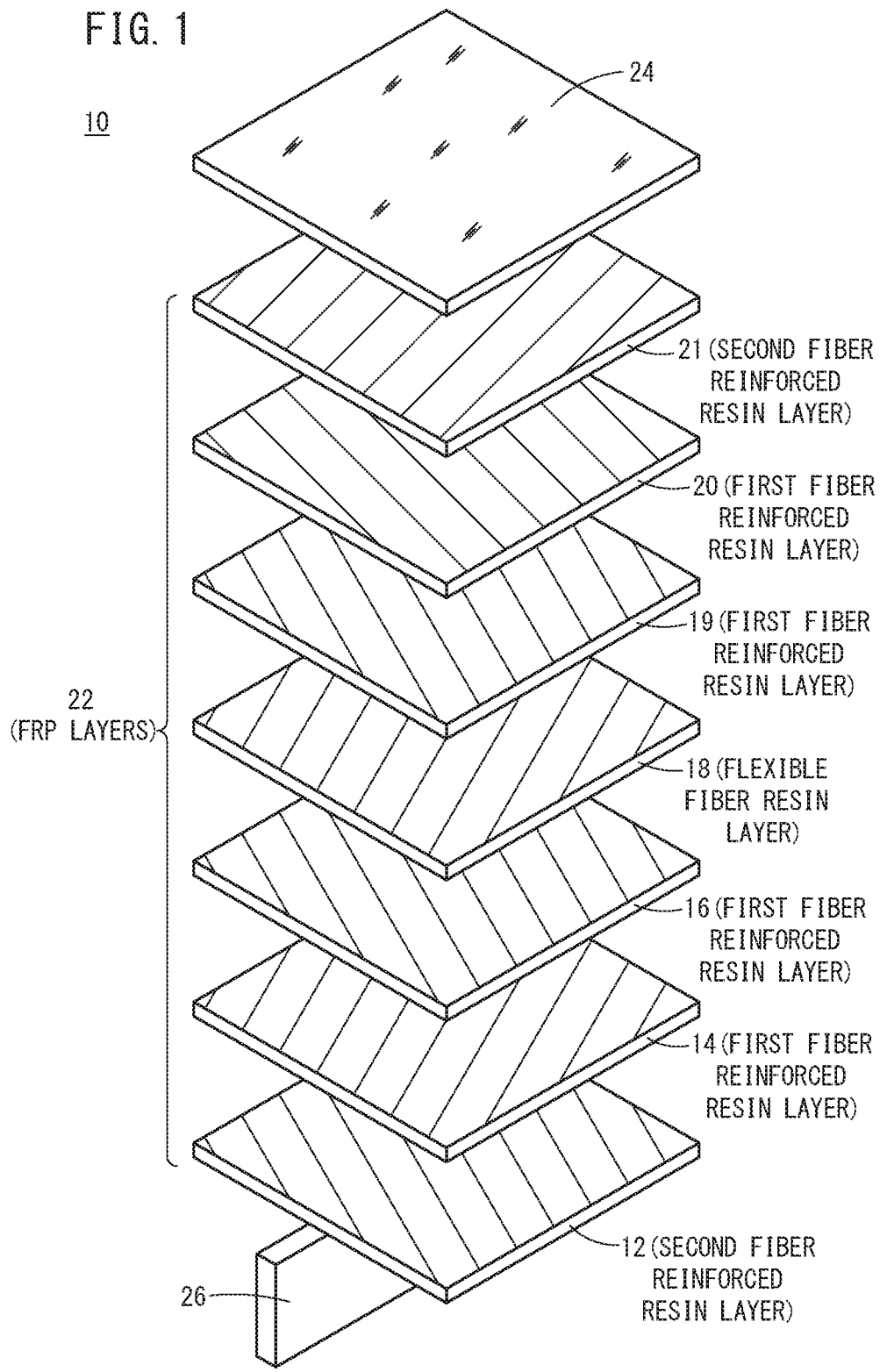
FIG. 1 is an exploded perspective view of principal parts of a fiber reinforced resin product according to an embodiment of the present invention.

A preferred embodiment of a fiber reinforced resin product according to the present invention will be presented and described in detail below with reference to the accompanying drawings. Moreover, in order to facilitate understanding, the constituent elements of the fiber reinforced resin product are shown with flat plate-like shapes in each of the drawings. However, it is a matter of course that the shape of the constituent elements, and hence the shape of the fiber reinforced resin product, are not limited to the shapes shown in the drawings.

Figure 2:
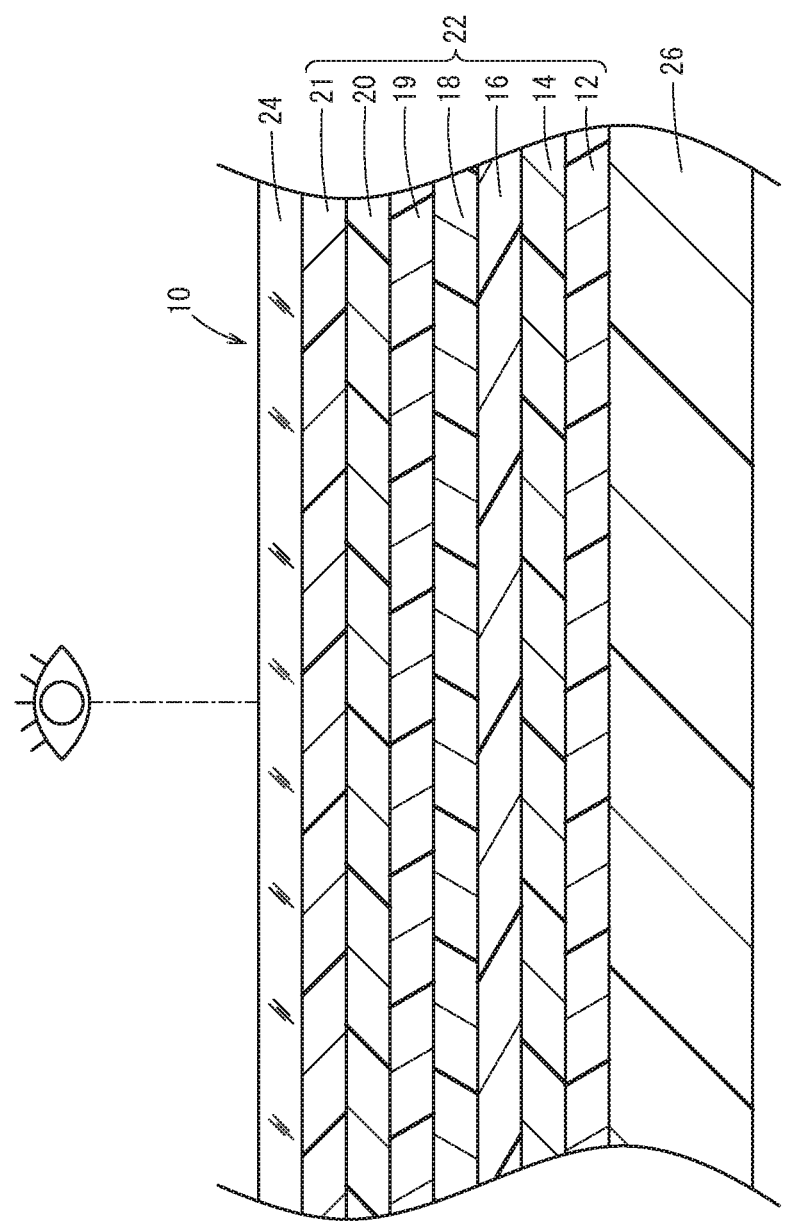
FIG. 2 is a vertical cross-sectional view of principal parts of the fiber reinforced resin product of FIG. 1.

FIGS. 1 and 2, respectively, are an exploded perspective view and a vertical cross-sectional view of principal parts of a fiber reinforced resin product 10 according to the present embodiment. The fiber reinforced resin product 10 includes FRP layers 22 in which the same matrix resin is impregnated into a first fiber layer 12, a second fiber layer 14, a third fiber layer 16, a fourth fiber layer 18, a fifth fiber layer 19, a sixth fiber layer 20, and a seventh fiber layer 21. Stated otherwise, the first fiber layer 12 through the seventh fiber layer 21 share a single matrix resin in common.

In the present embodiment, the second fiber layer 14, the third fiber layer 16, the fifth fiber layer 19, and the sixth fiber layer 20 are made of a first reinforcing fiber fabric having a large breaking elongation. More specifically, the second fiber layer 14, the third fiber layer 16, the fifth fiber layer 19, and the sixth fiber layer 20, which are impregnated with the matrix resin, respectively, are first fiber reinforced resin layers containing first reinforcing fibers in a layered form. Accordingly, in this case, the fiber reinforced resin product 10 includes four layers of the first fiber reinforced resin layer, and among such layers, two layers each are laminated onto each other.

Further, the first fiber layer 12 and the seventh fiber layer 21 are made from a second reinforcing fiber fabric having a smaller breaking elongation and a higher tensile strength in comparison with that of the first fiber reinforced resin layers. More specifically, the first fiber layer 12 and the seventh fiber layer 21, which are impregnated with the matrix resin, respectively, are second fiber reinforced resin layers containing second reinforcing fibers in a layered form. Accordingly, in this case, the fiber reinforced resin product 10 includes two layers of the second fiber reinforced resin layer.

Figure 3:
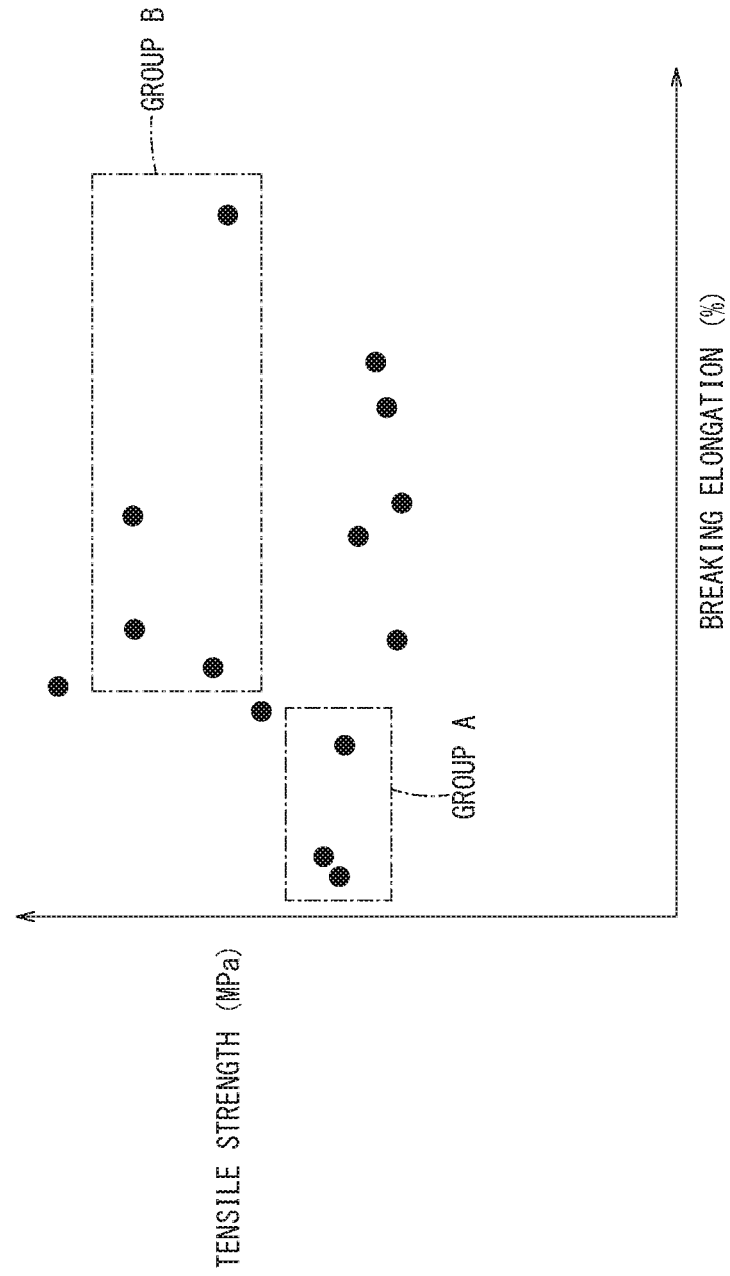
FIG. 3 is a graph showing a relationship between breaking elongation and tensile strength of various reinforcing fibers used in fiber reinforced resins.

Herein, FIG. 3 is a graph showing a relationship between breaking elongation and tensile strength of various reinforcing fibers used in fiber reinforced resins. As can be understood from FIG. 3, for example, the group of fibers belonging to Group A has a relatively small tensile strength and a relatively large breaking elongation, whereas the group of fibers belonging to Group B has a relatively large tensile strength and a relatively small breaking elongation. Accordingly, the first reinforcing fibers may be selected from the group of fibers belonging to Group A, and the second reinforcing fibers may be selected from the group of fibers belonging to Group B.

As preferred examples of the matrix resin, there may be cited various thermosetting resins, such as epoxy resins, polyester resins, phenol resins, melamine resins, urethane resins, and the like. Alternatively, the matrix resin may be a thermoplastic resin.

The fourth fiber layer 18 is made from flexible fibers having a greater flexibility and a lower bonding force with respect to the matrix resin in comparison with those of the first reinforcing fibers and the second reinforcing fibers. By impregnating the fourth fiber layer 18 with the matrix resin, a flexible fiber resin layer is formed containing flexible fibers in a layered form. In this manner, according to the present embodiment, the flexible fiber resin layer is interposed between the third fiber layer 16 that constitutes one of the first fiber reinforced resin layers, and the fifth fiber layer 19 that also constitutes one of the first fiber reinforced resin layers. It is a matter of course that the flexible fiber resin layer contributes to enhancing the strength and rigidity of the fiber reinforced resin product 10, in the same manner as the first fiber reinforced resin layers and the second fiber reinforced resin layers.

The fourth fiber layer 18 exhibits a smaller bonding force with respect to the matrix resin in comparison with that of the first fiber layer 12, the second fiber layer 14, the third fiber layer 16, the fifth fiber layer 19, the sixth fiber layer 20, and the seventh fiber layer 21. In addition, the fourth fiber layer 18 exhibits a larger flexibility in comparison with that of the first fiber layer 12, the second fiber layer 14, the third fiber layer 16, the fifth fiber layer 19, the sixth fiber layer 20, and the seventh fiber layer 21. As a preferred example of the flexible fibers that constitute the fourth fiber layer 18, aramid fibers may be cited.

The FRP layers 22 are constituted by impregnation of the same matrix resin into the aforementioned first fiber layer 12 through the seventh fiber layer 21. Stated otherwise, the FRP layers 22 include a single matrix resin, and the first fiber layer 12 through the seventh fiber layer 21. Moreover, in FIG. 1, the first fiber layer 12, the second fiber layer 14, the third fiber layer 16, the fourth fiber layer 18, the fifth fiber layer 19, the sixth fiber layer 20, and the seventh fiber layer 21 are shown respectively in hatching in order to facilitate discrimination of the layers from each other. However, the illustrated hatching is for the sake of convenience, and it is not intended to indicate the directions in which the first reinforcing fibers, the second reinforcing fibers, and the flexible fibers are oriented.

In addition to the FRP layers 22, the fiber reinforced resin product 10 further includes a transparent cover layer 24 (transparent resin layer) that covers a surface on a side of the seventh fiber layer 21 of the FRP layers 22, and a load detecting monitor member 26 which is placed in abutment with the first fiber layer 12 of the FRP layers 22.

The transparent cover layer 24, which is disposed on the side surface of the seventh fiber layer 21 of the FRP layers 22, is formed from a transparent resin that transmits light. The transparent cover layer 24 forms a surface (hereinafter referred to as a "main surface") on a side that is recognized visually by the user when used by the user. Accordingly, the user is capable of visually observing the seventh fiber layer 21 via the transparent cover layer 24. As can be understood from this fact, the seventh fiber layer 21 (second fiber reinforced resin layer) is positioned on an outermost side of the FRP layers 22, or stated otherwise, is positioned more outwardly than the second fiber layer 14, the third fiber layer 16 (both of which are first fiber reinforced resin layers), the fourth fiber layer 18 (the flexible fiber resin layer), the fifth fiber layer 19, and the sixth fiber layer 20 (both of which are first fiber reinforced resin layers).

The transparent resin is preferably made from a material having a larger breaking elongation than that of the matrix resin, the first reinforcing fibers, the second reinforcing fibers, and the flexible fibers. In this case, even if some type of load acts on the fiber reinforced resin product 10, and breakage occurs in the first fiber reinforced resin layers, which include the second fiber layer 14, the third fiber layer 16, the fifth fiber layer 19, and the sixth fiber layer 20, or in the second fiber reinforced resin layers, which include the first fiber layer 12 and the seventh fiber layer 21, since the transparent resin is still capable of stretching, breakage of the fiber reinforced resin product 10 does not easily occur. Therefore, a state is maintained in which the first fiber layer 12, the second fiber layer 14, the third fiber layer 16, the fifth fiber layer 19, the sixth fiber layer 20, and the seventh fiber layer 21 are covered by the transparent cover layer 24.

The load detecting monitor member 26, which is disposed on a side surface of the first fiber layer 12, and more specifically, on the rear surface of a main surface of the FRP layers 22, is disposed so as to protrude in a direction substantially perpendicular to a thickness direction (the direction in which the first fiber layer 12 through the seventh fiber layer 21 are arranged) of the FRP layers 22. A distal end of the load detecting monitor member 26 abuts against the second fiber reinforced resin layer including the first fiber layer 12 that is exposed on the rear surface.

The load detecting monitor member 26 is made of a resin having a flexibility lower than that of at least the FRP layers 22. In this case, when a load acts on the fiber reinforced resin product 10, the load detecting monitor member 26 becomes deformed or breaks prior to breakage of the second reinforcing fibers of the first fiber layer 12 (first fiber reinforced resin layer).

The fiber reinforced resin product 10, which is obtained in the manner described above, is used, for example, as a cowl, a fender, or the like of a motorcycle.

The fiber reinforced resin product 10 according to the present embodiment is constructed basically as described above. Next, operations and effects of the fiber reinforced resin product 10 will be described.

Figure 4:
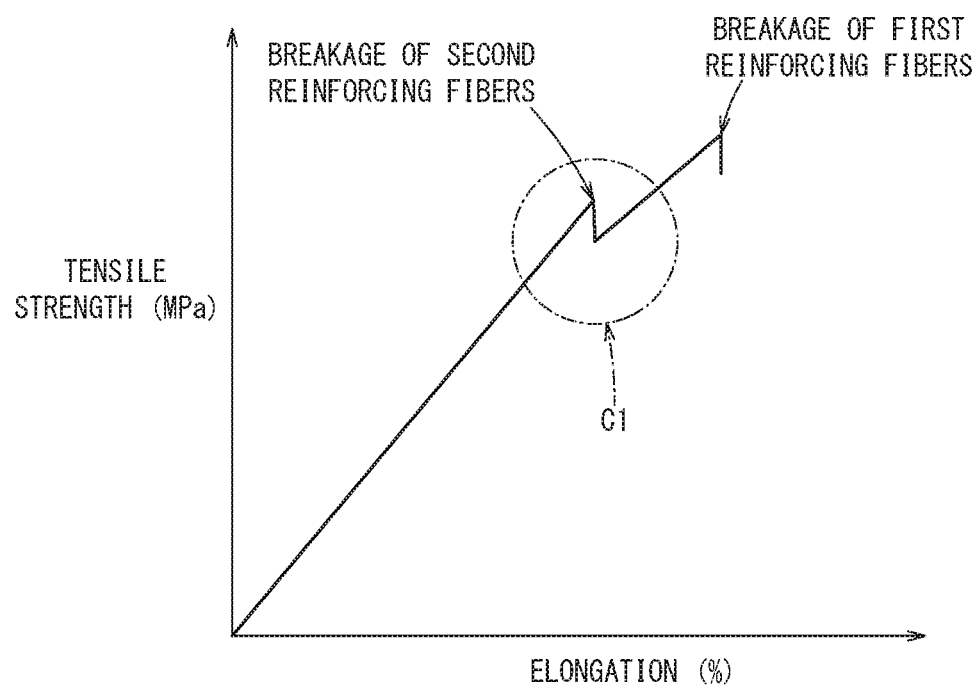
FIG. 4 is a graph showing a relationship between breaking elongation and tensile strength of the fiber reinforced resin product.

Situations occur in which loads act on the fiber reinforced resin product 10. In such a case, as shown in FIG. 4, the fiber reinforced resin product 10 undergoes elongation (stretching) in accordance with the magnitude of the load. More specifically, at first, elastic deformation occurs. Thereafter, when going beyond the elastic deformation range, the reinforcing fibers break.

Figure 5:
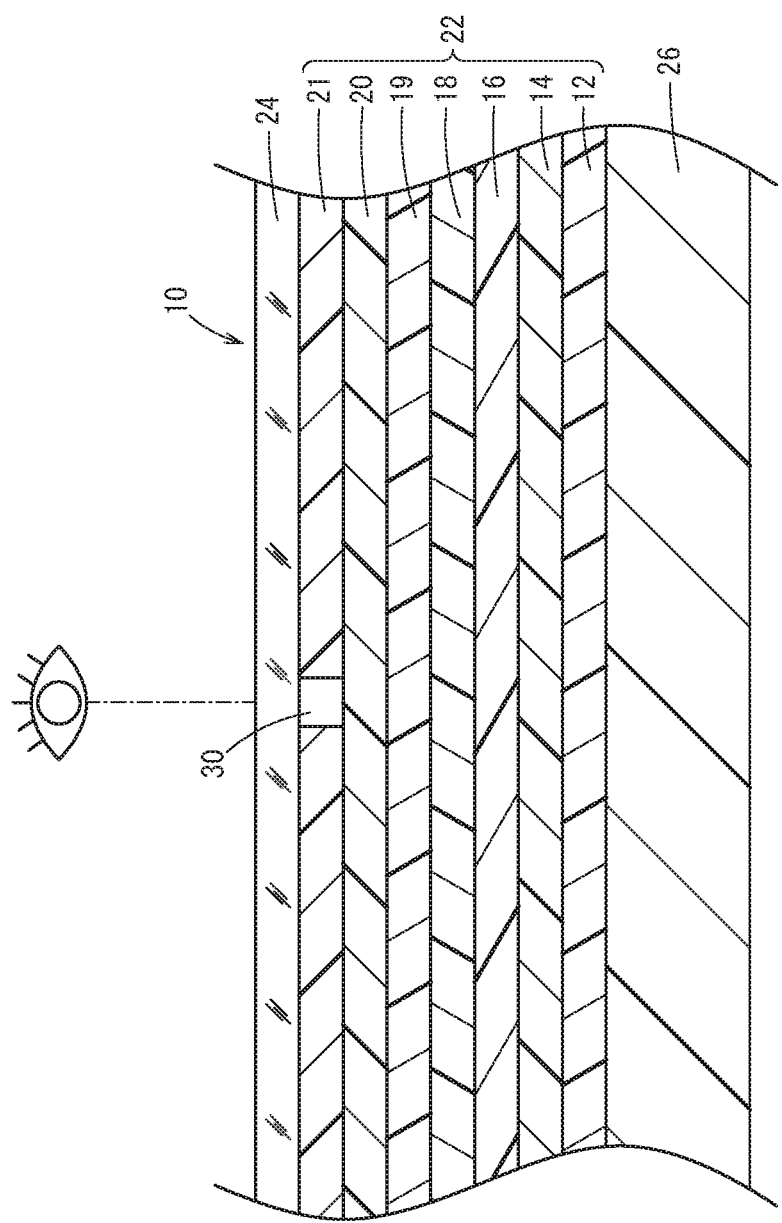
FIG. 5 is a longitudinal cross-sectional view of principal parts, showing a state in which breakage has occurred in the second reinforcing fibers of the seventh fiber layer constituting the fiber reinforced resin product shown in FIG. 1.

In this instance, as described above, according to the present embodiment, the first fiber layer 12 and the seventh fiber layer 21 (second fiber reinforced resin layers) are disposed on outermost sides of the FRP layers 22, while in addition, the breaking elongation of the second reinforcing fibers in the first fiber layer 12 and the seventh fiber layer 21 is smaller in comparison with that of the first reinforcing fibers in the second fiber layer 14, the third fiber layer 16, the fifth fiber layer 19, and the sixth fiber layer 20 (all of which are first fiber reinforced resin layers). Therefore, as shown in FIG. 5, the second reinforcing fibers are broken first and thereby form a fracture site 30. In this state, stresses decrease sharply, as indicated by the circle C1 in FIG. 4.

On the other hand, the first reinforcing fibers do not undergo breakage yet, because the breaking elongation thereof is larger than that of the second reinforcing fibers. In addition, even in the case that the tensile strength of the first reinforcing fibers is smaller than that of the second reinforcing fibers, by allowing the first fiber reinforced resin layers to be present in a plurality of layers, after breakage of the second reinforcing fibers, the first fiber reinforced resin layers bear the load. Therefore, breakage of the first reinforcing fibers at a short time after breakage of the second reinforcing fibers can be avoided. More specifically, by providing the plurality of first fiber reinforced resin layers, even after the second reinforcing fibers of the first fiber layer 12 and the seventh fiber layer 21 have broken, immediate breakage of the fiber reinforced resin product 10 is prevented.

Moreover, the matrix resin also has a greater breaking elongation than that of the second reinforcing fibers. Therefore, breakage of the matrix resin taking place before breakage of the second reinforcing fibers is avoided.

After the second reinforcing fibers have broken, the first reinforcing fibers do not undergo breakage until a greater level of stress is reached. Accordingly, the stress rises again as shown in FIG. 4.

At this stage, by visual inspection via the transparent cover layer 24 (see FIG. 5), the user is capable of recognizing that breakage has occurred in the second reinforcing fibers. More specifically, it can be easily grasped that a specified load has acted on the fiber reinforced resin product 10.

In addition, even when breakage occurs in the second reinforcing fibers, the second reinforcing fibers (seventh fiber layer 21) are covered by the transparent cover layer 24. More specifically, a state in which the broken second reinforcing fibers are covered by the transparent cover layer 24 is maintained, and therefore, exposure of the fibers is avoided.

Figure 6:
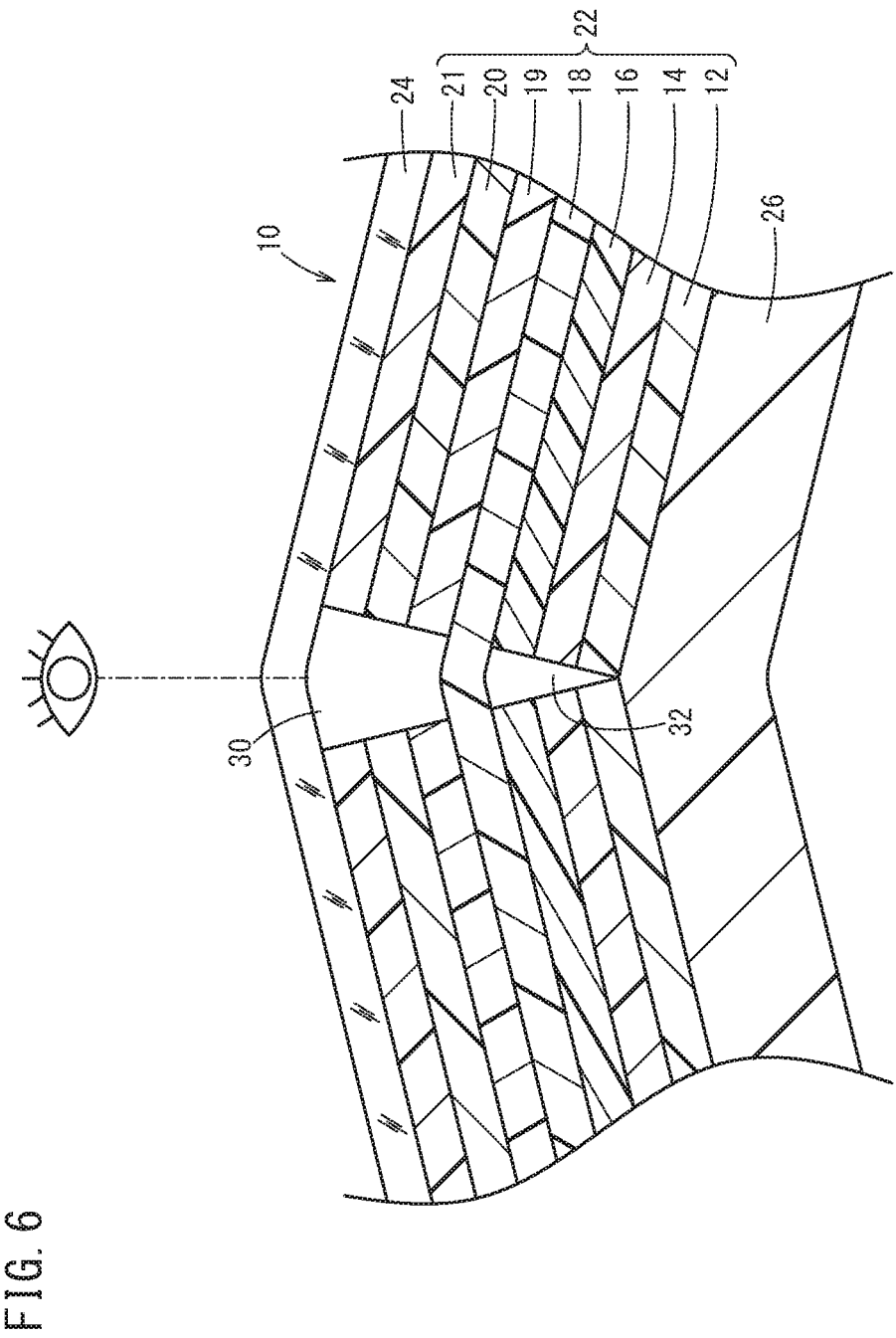
FIG. 6 is a vertical cross-sectional view of principal parts of the fiber reinforced resin product when a bending load acts thereon.

When the load is further increased, the load detecting monitor member 26 becomes deformed or broken prior to breakage of the first reinforcing fibers (see FIG. 6). This is because, as has been described above, the flexibility of the load detecting monitor member 26 is smaller than that of the FRP layers 22. By recognizing such a condition, the user is also capable of recognizing that there is a possibility that the first reinforcing fibers may break.

Moreover, the load detecting monitor member 26 is provided on the rear surface of the main surface, or stated otherwise, on a surface that is difficult to be seen from the perspective of the user. Accordingly, the aesthetic appearance of the main surface of the fiber reinforced resin product 10 is not impaired. In addition, in the case that the fiber reinforced resin product 10 is a cowl or the like for a motorcycle, it is possible to prevent the load detecting monitor member 26 from acting as a resistance with respect to the traveling wind.

When the load becomes even larger, then as shown in FIG. 4, the first reinforcing fibers are broken, and as shown in FIG. 6, a breakage point 32 is formed. Provisionally, even in such a case, according to the present embodiment, within the FRP layers 22, the fourth fiber layer 18 (flexible fiber resin layer) exists including the flexible fibers, the cross-linking density of which with the matrix resin is smaller in comparison with that of the first reinforcing fibers and the second reinforcing fibers. Therefore, when such a situation is reached, the fourth fiber layer 18 becomes exposed from between the third fiber layer 16 and the fifth fiber layer 19.

In addition, the fourth fiber layer 18 exhibits a larger flexibility in comparison with that of the first reinforcing fibers (the second fiber layer 14, the third fiber layer 16, the fifth fiber layer 19, the sixth fiber layer 20) and the second reinforcing fibers (the first fiber layer 12, the seventh fiber layer 21). Accordingly, when a bending load is applied thereto, the fourth fiber layer 18 easily bends, as shown in FIG. 6. Therefore, damage to the fiber reinforced resin product 10 can be avoided.

The fiber reinforced resin product 10 which is constituted in the foregoing manner is not particularly limited to the features described above, but is capable of being formed, for example, by a so-called RTM molding method. In this case, a molten resin is introduced into a cavity of a mold in which the first fiber layer 12 through the seventh fiber layer 21 are accommodated, and while the molten resin enters into gaps formed between the fibers of the first fiber layer 12 through the seventh fiber layer 21, the molten resin and the fibers are formed into a shape corresponding to the shape of the cavity. Thereafter, the molten resin is cooled and hardened, whereby the FRP layers 22 are obtained including the first fiber reinforced resin layers, the second fiber reinforced resin layers, and the flexible fiber resin layer.

Furthermore, the transparent cover layer 24 is disposed on the side surface of the seventh fiber layer 21 of the FRP layers 22. Thereafter, if necessary, a supporting member with the load detecting monitor member 26 formed to project therefrom is arranged in a manner so that the load detecting monitor member 26 is placed in abutment with the side surface of the first fiber layer 12 of the FRP layers 22. Consequently, the fiber reinforced resin product 10 is obtained.

In the foregoing manner, the fiber reinforced resin product 10 according to the present embodiment can be manufactured using a general RTM molding method. More specifically, there is no need to cause differences in toughness to occur by changing the curing rate of the matrix resin or the like. Accordingly, setting of conditions when molding is performed is easy, and the degree of freedom of the manufacturing conditions of the fiber reinforced resin product 10 is enhanced. As a result, according to the present embodiment, it is possible to obtain the fiber reinforced resin product 10 by a simple method.

The present invention is not particularly limited to the embodiment described above, and various modifications thereto are possible without departing from the essence and gist of the present invention.

For example, there is no particular need to provide both the first fiber layer 12 and the seventh fiber layer 21, and the seventh fiber layer 21 may be omitted.

Further, in the above-described embodiment, the flexible fiber resin layer is disposed in an intervening manner between respective ones of the first fiber reinforced resin layers. However, the flexible fiber resin layer may also be disposed between the first fiber reinforced resin layer and the second fiber reinforced resin layer.

Furthermore, in the above-described embodiment, the number of the first fiber reinforced resin layers is four.

However, the number of the first fiber reinforced resin layers may be one or more, and the number of such layers is not particularly limited.

In addition, the load detecting monitor member 26 may be constituted from any type of fiber reinforced resin, such as long fibers, short fibers, chopped fibers, or the like.

What is claimed is:

1. A fiber reinforced resin product comprising a fiber reinforced layer including:
   at least one first fiber reinforced resin layer in which only first reinforcing fibers are contained in a layered form, and
   at least two second fiber reinforced resin layers in which only second reinforcing fibers having a smaller breaking elongation in comparison with that of the first reinforcing fibers are contained in a layered form;
   wherein a laminated body is formed by placing all the first fiber reinforced resin layer between the at least two second fiber reinforced resin layers and placing the at least two second fiber reinforced resin layers at an uppermost position and a lowermost position;
   the laminated body includes a single matrix resin that the first fiber reinforced resin layer and the second fiber reinforced resin layer share in common; and
   wherein a flexible fiber resin layer, in which flexible fibers are included in a layered form, the flexible fibers having a greater flexibility and a lower bonding force with respect to the matrix resin in comparison with those of the first reinforcing fibers and the second reinforcing fibers, is disposed in an intervening manner between the first fiber reinforced resin layer and the second fiber reinforced resin layer, or between respective ones of the first fiber reinforced resin layers.

2. The product according to claim 1, wherein:
   the first reinforcing fibers have a smaller tensile strength in comparison with that of the second reinforcing fibers, and the first fiber reinforced resin layer is laminated in a plurality of layers; and
   the second fiber reinforced resin layer is positioned outwardly of the laminated plural layers of the first fiber reinforced resin layer.

3. The product according to claim 1, wherein the breaking elongation of the matrix resin is larger in comparison with that of the second reinforcing fibers.

4. A fiber reinforced resin product comprising a fiber reinforced layer including:
   at least one first fiber reinforced resin layer in which only first reinforcing fibers are contained in a layered form, and
   at least two second fiber reinforced resin layers in which only second reinforcing fibers having a smaller breaking elongation in comparison with that of the first reinforcing fibers are contained in a layered form;
   wherein a laminated body is formed by placing all the first fiber reinforced resin layer between the at least two second fiber reinforced resin layers and placing the at least two second fiber reinforced resin layers at an uppermost position and a lowermost Position;
   the laminated body includes a single matrix resin that the first fiber reinforced resin layer and the second fiber reinforced resin layer share in common; and
   wherein a load detecting monitor member made from a resin having a smaller flexibility in comparison with that of the first fiber reinforced resin layer and the second fiber reinforced resin layer is placed in abutment inwardly of the first fiber reinforced resin layer.

5. The product according to claim 4, wherein:
   the first reinforcing fibers have a smaller tensile strength in comparison with that of the second reinforcing fibers, and the first fiber reinforced resin layer is laminated in a plurality of layers; and
   the second fiber reinforced resin layer is positioned outwardly of the laminated plural layers of the first fiber reinforced resin layer.

6. The product according to claim 4, wherein the breaking elongation of the matrix resin is larger in comparison with that of the second reinforcing fibers.

\* \* \* \* \*